United States Patent
Wickham et al.

[19]

[11] Patent Number: 6,094,285
[45] Date of Patent: *Jul. 25, 2000

[54] ALL OPTICAL RF SIGNAL CHANNELIZER

[75] Inventors: Michael G. Wickham, Rancho Palos Verdes; John C. Brock, Redondo Beach; Philip H. Wisseman, Hermosa Beach; Lawrence J. Lembo, Torrance, all of Calif.

[73] Assignee: TRW Inc., Redondo Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/759,901

[22] Filed: Dec. 4, 1996

[51] Int. Cl.⁷ .................................................. H04J 14/02
[52] U.S. Cl. .......................... 359/130; 359/127; 372/48; 385/28; 385/37
[58] Field of Search .................................. 359/130, 124, 359/127; 385/24, 28, 129, 37; 356/349; 372/48

[56] References Cited

U.S. PATENT DOCUMENTS

| | | | |
|---|---|---|---|
| 4,079,382 | 3/1978 | Henry | 343/909 |
| 4,448,494 | 5/1984 | Freyre | 359/285 |
| 4,460,250 | 7/1984 | Freyre et al. | 359/287 |
| 4,468,766 | 8/1984 | Spezio | 359/130 |
| 4,634,230 | 1/1987 | Spezio | 359/311 |
| 4,644,267 | 2/1987 | Tsui et al. | 99/483 |
| 4,671,605 | 6/1987 | Soref | 350/96.15 |
| 4,695,790 | 9/1987 | Mathis | 324/76.36 |
| 4,726,011 | 2/1988 | Ih et al. | 359/127 |
| 4,839,884 | 6/1989 | Schloss | 372/48 |
| 5,002,350 | 3/1991 | Dragone | 350/96.15 |
| 5,005,946 | 4/1991 | Brandstetter | 359/15 |
| 5,039,189 | 8/1991 | Lytel et al. | 385/2 |
| 5,081,710 | 1/1992 | de Groot et al. | 359/184 |
| 5,105,380 | 4/1992 | Owechko | 364/825 |
| 5,327,142 | 7/1994 | Tsui et al. | 342/192 |
| 5,347,525 | 9/1994 | Faris | 347/17 |
| 5,363,221 | 11/1994 | Sutton et al. | 359/11 |
| 5,377,035 | 12/1994 | Wang et al. | 359/156 |
| 5,379,309 | 1/1995 | Logan, Jr. | 372/18 |
| 5,410,625 | 4/1995 | Jenkins et al. | 385/28 |
| 5,625,723 | 4/1997 | Dragone et al. | 385/37 |
| 5,777,793 | 7/1998 | Little et al. | 359/127 |
| 5,793,912 | 8/1998 | Boord et al. | 385/37 |

OTHER PUBLICATIONS

Statutory Invention Registration H1059, published May 5, 1992.

J.M. Heaton, et al., "Novel 1–to–N way integrated optical beam splitters using symmetric mode mixing in GaAs/AlGaAs multimode waveguides," Apply. Phys. Lett. 61 (15), Oct. 12, 1992, pp. 1754–1756.

R.M. Jenkins, et al., "Waveguide beam splitters and recombiners based on multi–mode propagation phenomena," Optics Letters, vol. 17, No. 14, Jul. 15, 1992, pp. 991–993.

N. Takato, et al., "Low–Loss High–Silica Single–Mode Channel Waveguides," Electronics Letters, Mar. 13, 1986, vol. 22, No. 6, pp. 321–322.

N. Takato, et al., "Silica–Based Integrated Optic Mach–Zehnder Multi/Demultiplexer Family with Channel Spacing of 0.01–250 nm," IEEE Journal, vol. 8 No. 6, Aug. 1990, pp. 1120–1127.

N. Takato, et al., "Silica–Based Single–Mode Waveguide on Silicon and their Application to Guided–Wave Optical Interferometers," Journals of Lightwave Technology, vol. 6, No. 6, Jun. 1988, pp. 1003–1010.

*Primary Examiner*—Jeffery A. Hofsass
*Assistant Examiner*—John Tweel, Jr.
*Attorney, Agent, or Firm*—Michael S. Yatsko

[57] ABSTRACT

A channelizer for signals for optically channelizing RF signals modulated onto an optical carrier by optically separating the RF signals and mapping the RF signals by way of an optically dispersive element, such as a diffraction grating. In an alternate embodiment of the invention, two stages of optical filters elements are provided in series to perform sequential channelization. Bragg reflection gratings are used for coarse filtering into predetermined bands while Fabry-Perot filters tuned to specific sub-bands of the Bragg reflection gratings are used for channelization. In alternate embodiments of the invention, a silica planar waveguide and an optical splitting device, such as a Talbot splitter, are used.

10 Claims, 6 Drawing Sheets

ALL OPTICAL RF SIGNAL CHANNELIZER

BACKGROUND OF THE INVENTION

1. Field of the Invention

The present invention relates to a channelizer for RF signals and more particularly to an optical RF channelizer, for example, for use for RF spectral analysis, for optically channelizing RF signals modulated onto an optical carrier by optically separating the RF spectrum.

2. Description of the Prior Art

Communications systems, and in particular, military communications systems, are increasingly being driven toward higher frequencies and larger bandwidths by user requirements. For example, available communication bandwidth is disappearing as the number of users and the bandwidth per user escalates, forcing communication links to ever higher frequencies. In addition, modern missile seekers and imaging radar systems are utilizing frequencies as high as 94 GHz to achieve antenna directivity and higher resolution for small aperture systems. In order to accommodate relatively high bandwidth and high frequencies, RF communications systems are known to employ optical carrier transmission of the RF signal. Examples of such systems are disclosed in U.S. Pat. Nos. 4,468,766; 4,695,790; 5,005,946; 5,347,535; 5,377,035; and U.S. statutory invention registration H1059.

Optical channelizers are used to perform spectral analysis of the newer high frequency communication signals. Such optical channelizers are known to process relatively wider bandwidths than comparable RF channelizers for real time identification of complex signals. Examples of such optical channelizers are disclosed in U.S. Pat. Nos. 4,460,250 and 4,695,795 and U.S. Statutory Invention Registration H1059. Such channelizers are used to channelize or divide up a relatively wide bandwidth signal into several sub-bands or channels. Such optical channelizers are known to process relatively wider bandwidths than known RF channelizers. However, many of the optical channelizers utilize acousto-optic technology and thus are limited to RF bandwidths of a few GHz. Examples of optical communication systems utilizing acousto-optic technology are disclosed in U.S. Pat. No. 4,448,494; 4,644,267; 5,005,946; 5,105,380; 5,327,142; and 5,363,221.

In other known communications systems, the channelizing is done in the RF band. In such systems, the RF signal is demodulated from the optical carrier and greatly amplified in order to achieve channelization.

SUMMARY OF THE INVENTION

It is an object of the present invention to solve various problems in the prior art.

It is yet another object of the present invention to provide an optical channelizer for optically channelizing RF signals modulated onto an optical carrier. It is yet another object of the present invention to provide an optical channelizer which eliminates the need for demodulating the RF signals from the optical carrier. Briefly, the present invention relates to a channelizer for RF signals and more particularly to a RF channelizer for optically channelizing RF signals modulated onto an optical carrier by optically separating or mapping the RF spectrum by way of an optically dispersive element, such as a conventional diffraction grating, or a silica planar waveguide tapped delay line. In an alternate embodiment of the invention, two stages of optical filters elements are provided in series to perform sequential channelization. Bragg reflection gratings are used for coarse filtering into 3–4 GHz bands while Fabry-Perot filters tuned to specific sub-bands of the Bragg reflection grating is used for channelization.

BRIEF DESCRIPTION OF THE DRAWING

These and other objects of the present invention will be readily understood with reference to the following specification and attached drawing, wherein.

DETAILED DESCRIPTION OF THE INVENTION

The present invention relates to an optical channelizer for channelizing relatively wide band high frequency RF communication signals. In order to enable signal processing of higher frequency communication signals, the channelizing is done optically without utilizing an acousto-opto coupler device. As such, the system allows for signal processing and in particular, channelizing of RF signals having frequencies, for example, up to 100 GHz.

Figure 1:
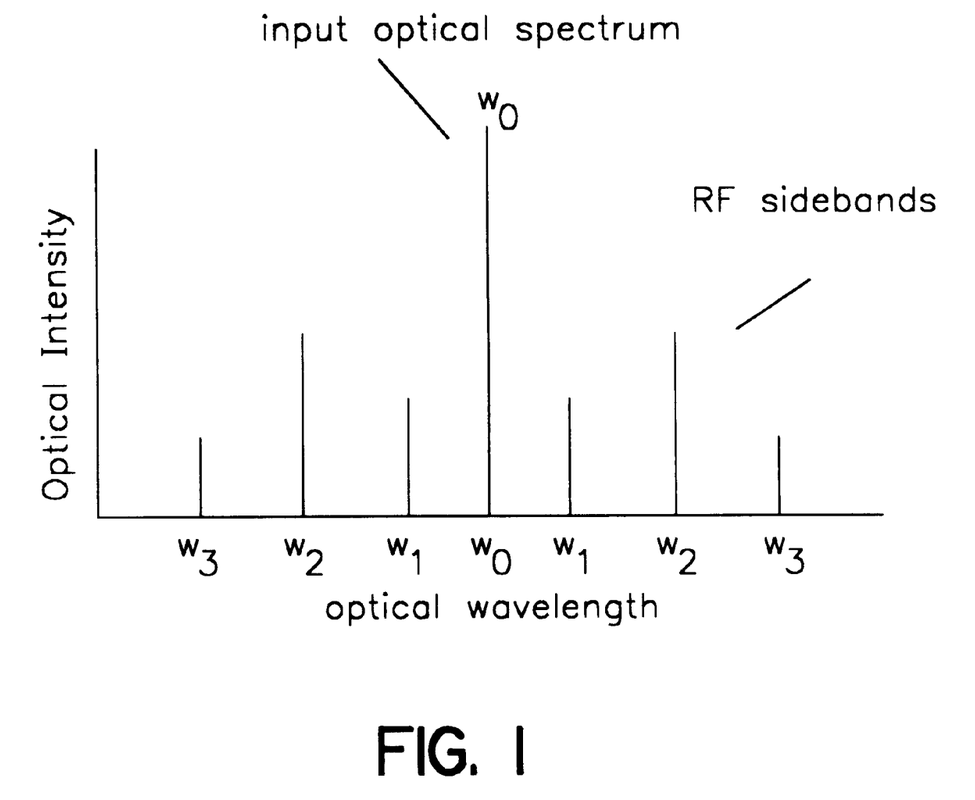
FIG. 1 is a frequency diagram of optical wavelength vs. optical amplitude illustrating an optical carrier and RF sidebands.

When a RF signal is modulated onto an optical carrier, the resulting optical spectrum replicates the input RF signals. In other words, the RF signals is upconverted to optical frequencies, wherein the RF signals are represented by sidebands on the optical carrier with an optical frequency offset and amplitude corresponding to the RF frequency and amplitude. For example, as illustrated in FIG. 1, the optical amplitude is illustrated on the vertical axis while the optical wavelength is shown on the horizontal axis. The optical carrier frequency is shown at a wavelength of T0. Exemplary RF frequencies T1, T2 and T3 are represented by sidebands relative to the optical carrier frequency T0.

An important aspect of the invention is that the sidebands representing the input RF signals are optically separated, to provide optical channelizing of the RF spectrum without the need for downconverting the modulated optical signal which requires demodulation and a relatively high RF gain amplifier. Another important aspect of the invention is that it does not rely on the use of acousto-opto technology which limits the overall bandwidth of the channelizer. As such, with the present invention, optical heterodyning may be used to downconvert the modulated optical signals to a common RF frequency so that the channels of the RF modulated optical carrier can be utilized with a detector optimized for a single frequency. The heterodyning allows both phase and amplitude to be recovered from the original RF signals.

In order to maximize the dynamic range of any one channel, distortions introduced during the optical modulation process are preferably minimized. This requires an effective linear electrical-to-optical (voltage-to-transmission) characteristic for the overall RF/optical link. By utilizing heterodyne optical detection, the demodulated RF voltage waveform in any one channel is proportional to the product of the local oscillator field (ELO) and the signal field (Es). Since this waveform is proportional to the input voltage waveform, the optical modulator transmits an electric field amplitude that is linear with input voltage. Since electric field is proportional to the square root of optical amplitude, an ideal characteristic is one that transmits an amplitude proportional to the square of the input voltage. Thus, if the modulation transfer characteristic is quadratic, the current waveform generated in the photodetector reverts to a true representation of the ideal signal. Although such ideal quadratic modulators are not currently available, a Mach-Zehnder interferometric modulator may be used and operated at a low bias point. Under such modulation conditions, known second order inter-modulation products are minimized while the dynamic range is maximized.

Figure 5:
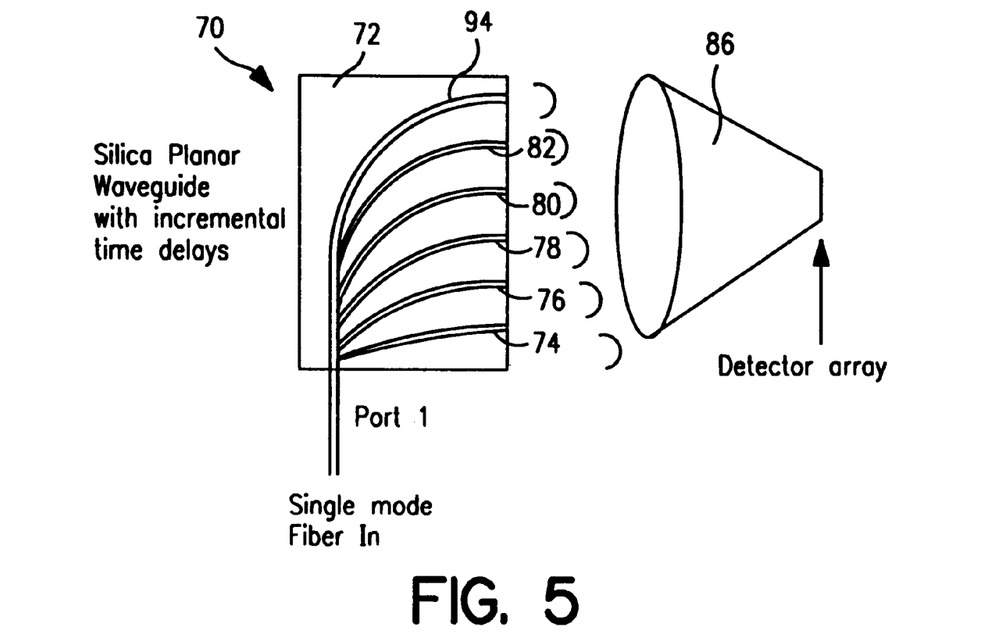
FIG. 5 is a diagram of a waveguide implementation with incremental time delays for use with the present invention.
Figure 6:
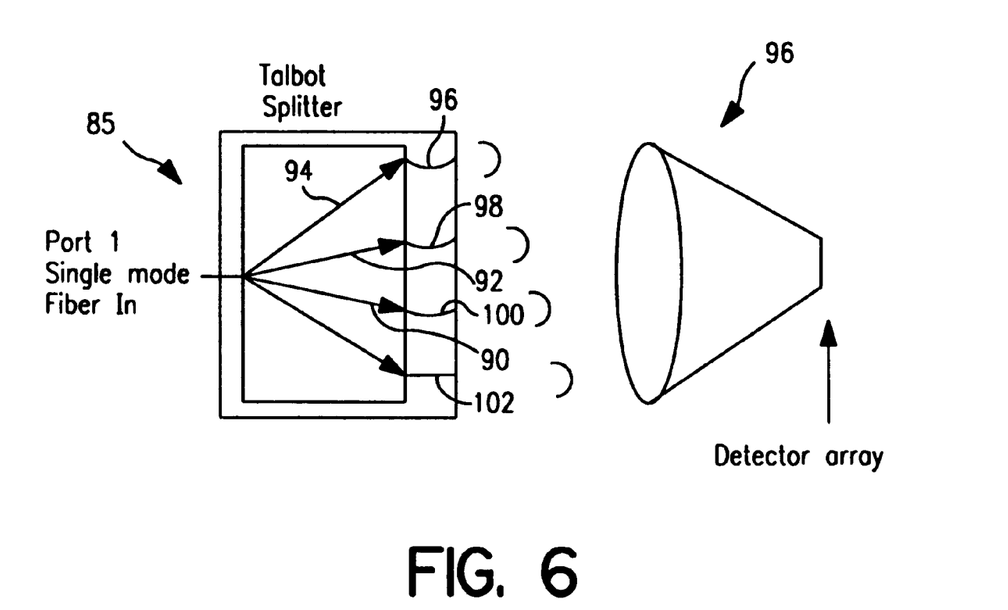
FIG. 6 is a diagram of a Talbot splitter for use with the present invention.

Multiple embodiments of the invention are disclosed for channelization of RF spectrum signals. The first embodiment, illustrated in FIGS. 2 and 3, utilizes a dispersive element, such as a spatial dispersion grating, while the second embodiment illustrated in FIG. 4 utilizes a sequence of fiber optic Fabry-Perot filters and fiber optic Bragg gratings. FIGS. 5 and 6 represent embodiments that are amenable to monolithic fabrication. In particular, FIG. 5 and relates to an embodiment utilizing a silica planar waveguide while FIG. 6 illustrates an embodiment utilizing a Talbot splitter.

Figure 2:
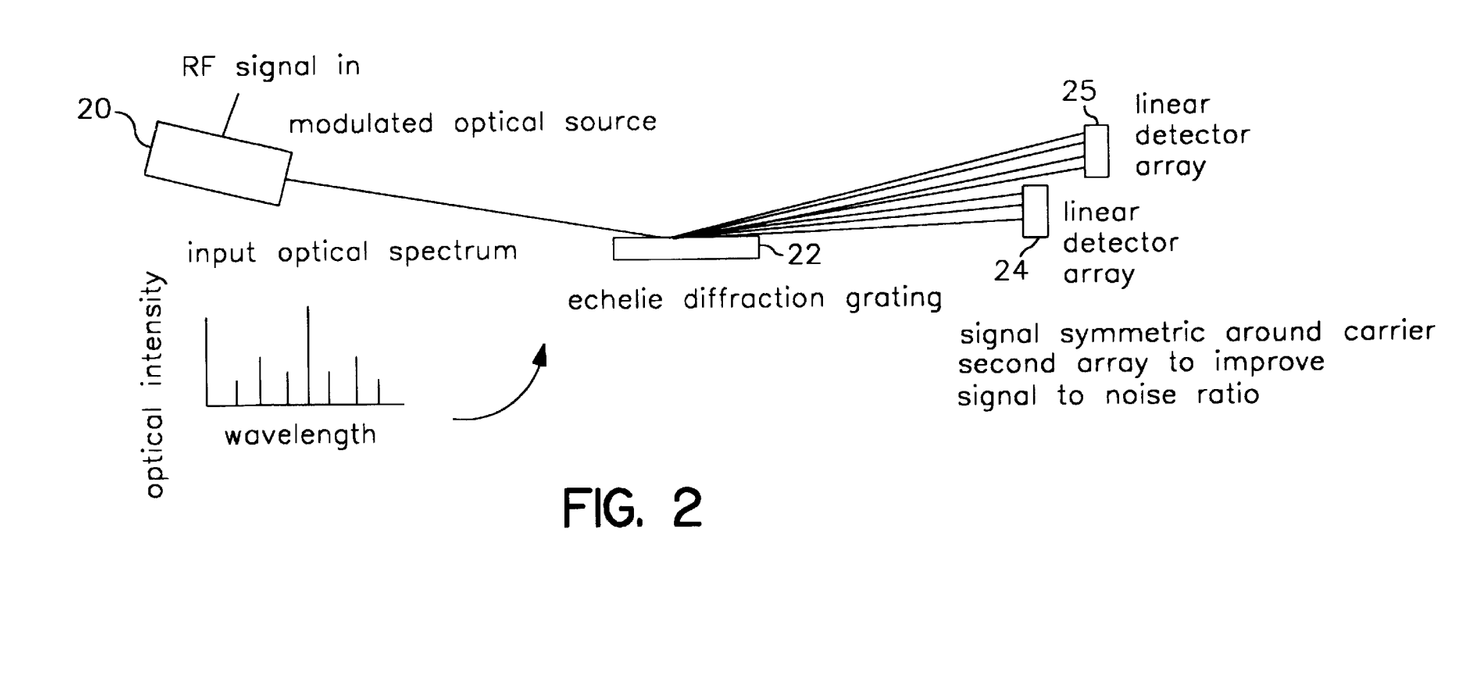
FIG. 2 is a diagram of an all optical channelizer in accordance with the present invention.
Figure 3:
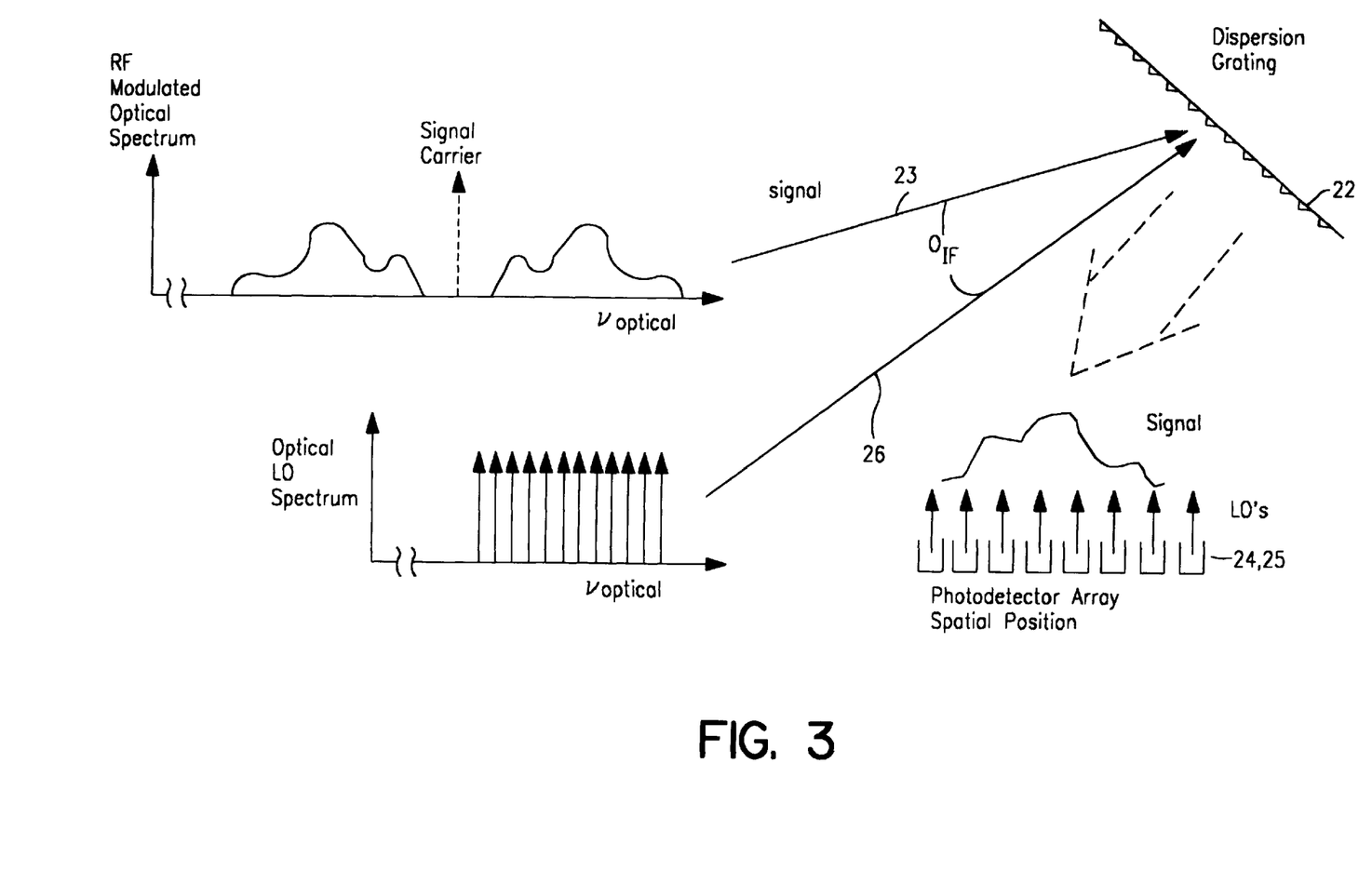
FIG. 3 is a diagram illustrating heterodyne optical separation in accordance with the present invention.

Referring to the embodiment illustrated in FIGS. 2 and 3, a diffraction grating is used as a spatially dispersive element to channelize the RF spectrum in a single parallel operation. In particular, RF input signals are input to an RF-optical modulation device 20, such as a diode laser or an electro-absorptive modulator or preferably, as discussed above, a Mach-Zehnder interferometer. The modulator 20 generates the optical spectrum as illustrated in FIG. 1. The optical signal from the modulator 20 is impinged on a dispersive element 22, such as a conventional high dispersion diffraction grating, such as a echelle, blazed for high optical diffraction efficiency. The angular dispersion results in a spatial separation or mapping of the optical frequencies i.e. separation of the RF sidebands onto the optical carrier. One or more detector arrays 24, 25, for example, linear detector arrays, are spaced a distance away from the dispersive element 22 to receive the dispersed optical signals. Each of the detector elements in the linear detector arrays, 24 and 25 receives an optical signal with an amplitude proportional to the RF power. As shown, the detector array 25 can be used to improve signal to noise ratio.

As mentioned above, heterodyning is used to downconvert an optical signal to a common RF frequency so that the separated portions or channels of the RF modulated optical carrier can utilize a detector optimized for a single frequency. The local oscillators used for the heterodyning can be generated by a mode-locked laser which provides a set of phase coherent monochromatic optical sources separated in frequency by a common interval equal to the desired channel spacing to allow both phase and amplitude to be recovered from the original RF signals. As shown in FIG. 3, a mode-locked laser, used as an optical local oscillator, represented by the line 26, is directed to the dispersive element 22; however, the local oscillator signals 26 are injected onto the dispersive element at a slightly different angle than the signal laser, represented by the line 28, to define an IF frequency. In particular, the mode locked laser 26 provides a comb of optical oscillators whose frequencies are separated by the desired channel spacing. The spectral components of the dispersed RF signal laser and the comb of frequencies generated by the mode-locked laser are combined at the detector location 24, 25, which may either, for example, a linear detector array. Each portion or channel of the modulated signal laser and one component of the frequency comb at each detector site will have a frequency offset which can serve as the heterodyne frequency which can be adjusted by varying the injection angle offset to the dispersive elements. In this way, each photodetector generates the same optical beat frequency so that each detector channel can use the same post detection electronics. The IF beat frequency can be tuned by adjusting the offset in incident angles at which the signal and local oscillator lasers are impinged on the dispersive element 22. The beat frequency can be adjusted to be equal to the channelized bandwidth to allow the use of relatively slow photodetectors even for channels corresponding to very high RF signal frequencies. The signal power spectrum is determined by measuring the RF power of the heterodyne products generated in each photodetector channel. The complex signal spectrum, both phase and amplitude, can be extracted by measuring the inphase and quadrature components of the heterodyne products.

Various commercial gratings are suitable for use for the embodiment illustrated in FIGS. 2 and 3. For example, a 161×811 grating ruled at 316 lines per millimeters (mm) and used in fourth order, achieves a single reflection spectral resolution of 444 MHz (for a 1.5:m optical carrier wavelength) with an optical diffraction efficiency of 80%. Alternatively, a more compact system can be based upon the standard technique of multiple diffraction passes. For example, a triple pass grating design with the same frequency resolution with diffraction gratings approximately 5" to 6" in size. Since the beam pass for the signal and local oscillator effectively see each of the three gratings in series, the net dispersion is tripled. This allows the focal length to be reduced to ⅓ of the single grating design.

Figure 7:
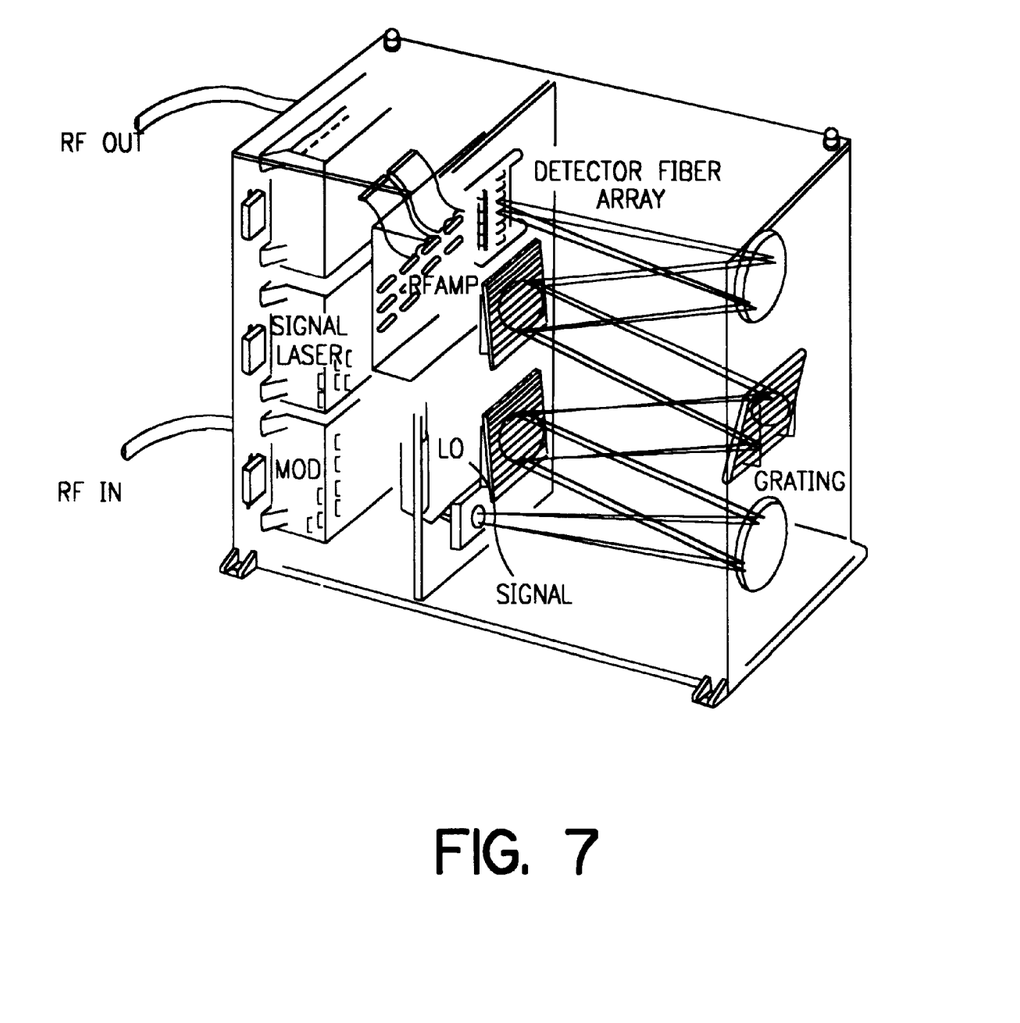
FIG. 7 is a perspective view of an optical channelizer in accordance with the present invention, illustrating the use of a triple grating.

For a commercial grating, the spectral dispersion dθ/dλ is set forth in Equation (1) below:

$$\frac{d\theta}{d\lambda} = n/(d\cos(\theta)) = 1.80 \text{ radian per micron}$$

where d=grating line spacing in microns. A channel spacing of one GHz (optical wavelength and below 0.008 nanometers) therefore implies an angular channel separation of 14 microradians. For a focal plane element spacing of 10 microns, a 0.7 meter focal length system is required; however, the optical paths may be folded to make the system more compact. The entire 100 GHz spectrum spans an angular size of 0.991 microradians which translates to a focal plane array length of 2.2 millimeters. Assuming the same focal plane geometry, the triple pass system, for example, as illustrated in FIG. 7, can be used to reduce the focal length to 0.7 meters divided by 3 (i.e., 24 centimeters.

Figure 4:
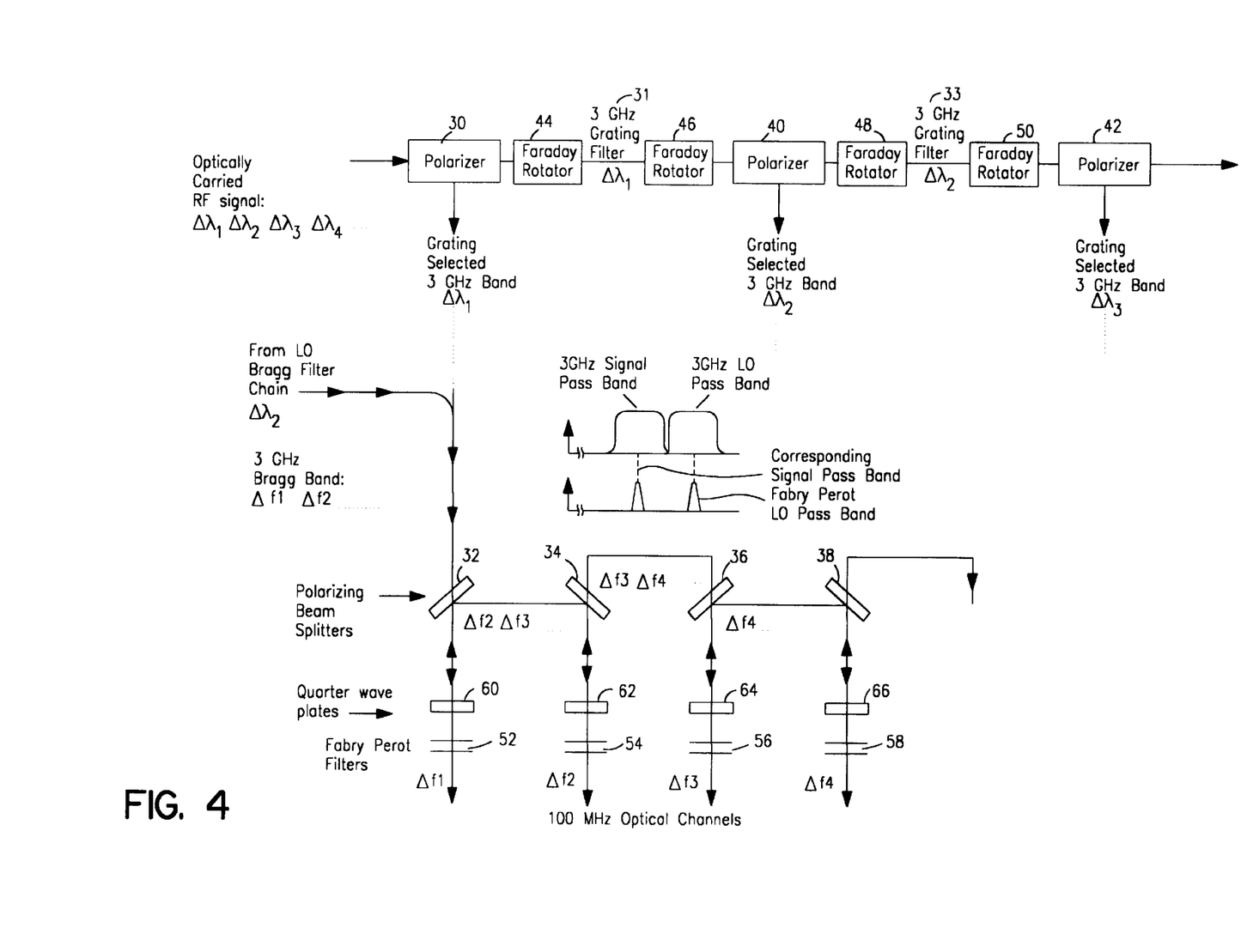
FIG. 4 is a diagram of an alternate embodiment of the all optical channelizer illustrated in FIG. 2.

In the second embodiment, illustrated in FIG. 4, two stages of optical filter elements are used in series to perform sequential bandwidth channelization. In particular, Bragg reflection gratings 31, 33 are used for coarse prefiltering of the optically carried RF spectrum into predetermined optical bands, for example 3GHz. Channel pick off may be achieved using a sequence of channel pick-off devices, such as polarizing beam splitters 30, 32, 34, 36, 38, 40 and 42 and Faraday rotators 44, 46, 48 and 50. The bands are filtered into higher resolution sub-bands by way of chains of Fabry- Perot reflection filters 52, 54, 56 and 58 and corresponding quarter wave plates 60, 62, 64 and 66. Each Fabry-Perot reflection filter 52, 54, 56 and 58 is tuned to transmit a specific sub-band of the 3 GHz Bragg grating 31, 33 band. All remaining sub-bands are reflected and transmitted through the rest of the Fabry-Perot chain to complete the channelization of the Bragg grating band.

Local oscillators are channelized using a Bragg grating series similar to that used to channelize a signal laser. 3 GHz local oscillator bands are combined with the 3 GHz signal laser bands at the Fabry-Perot chain inputs but offset by one Bragg grating band to generate an IF beat frequency. The Fabry-Perot free spectral range is set equal to the Bragg grating bandwidths so that the local oscillator and the signal bands can pass through a common Fabry-Perot chain. The local oscillators are the stronger of the signals so that Fabry-Perot transmission peaks are locked to the local oscillator frequencies in the closed loop mode.

Both the Bragg filter and Fabry-Perot filter chains section the bands of the spectrum and send the rest of the spectrum down the filter chain for subsequent sectionizing without discarding any of the optical energy. Other than transmission losses, no energy is discarded. The Bragg filter chain uses polarization beam splitters and quarter wave Faraday rotators along with Bragg filters to distribute the sub-bands of the RF modulated optical spectrum. The Fabry-Perot chain uses ¼ wave plates and polarization beam splitter to distribute the bands of the RF modulated optical spectrum into individual channels.

The local oscillators are generated by a mode-locked laser. The local oscillators are filtered into coarse sub-bands with a Bragg grating series similar to, but separate from the signal laser. Any one local oscillator sub-band and signal laser sub-band are sent down one Fabry-Perot chain. However, the local oscillator sub-band and the signal sub-band are separated in frequency by the free spectral range of the Fabry-Perot devices. The free spectral range defines the intermediate frequency and is selectable.

Ideally, the channelizer can be formed on a small wafer, by utilizing the principles incorporated in a Michelson echelon. Very high resolving power with 1000 lines or elements in a large angular dispersion can be achieved when operating in high order. The small free spectral range that results when working at high orders is sufficient for the application. The large incremental time delay between lines or elements that results when operating at high order is achieved with staggered stacked plates in a Michelson echelon, as generally shown is FIG. 5. In particular, FIG. 5 illustrates single mode channels or waveguides 70 formed as a silica planar waveguide. A modulated signal carried on a single mode fiber is injected at port 1 and sequentially divided into individual waveguides with incrementally longer pathlengths. Such a device with incremental time delays of, for example, five picoseconds having 1000 elements would have a resolution of 200 MHz and fit on a 5 centimeter wafer.

Silica planar waveguides formed as silica based optical integrated circuits, as illustrated in FIG. 5, are generally known in the art and disclosed in "Silica-Based Integrated Optic Mach-Zehnder Multi/Demultiplexer Family with Channel Spacing of 0.01–250 nm" by N. Takato, T. Kominato, A. Sugita, K. Jinguji, H. Toba and M. Kawachi, *IEEE Journal on Selected Areas in Communications*, Vol. 8, No. 6, pps. 1120–1127, August 1990, hereby incorporated by reference. Such silica planar waveguides are formed on a silica substrate 72 by flame hydrolysis deposition and conventional photolithographic techniques followed by reactive ion etching. Flame hydrolysis is based on optical fiber fabrication, while photolithographic and reactive ion etching processes are compatible with existing silicon technology as generally disclosed in "Silica-Based Single Mode Waveguides and Their Application to Guided-Wave Optical Interferometers", by N. Takato, K. Jinguji, M. Yasu, H. Toba and M. Kawachi, *Journal of Lichtwave Technology*, Vol. 6, pp. 1003–1010, 1988 and "Low-Loss High Silica Single Mode Channel Waveguides", by N. Takato, M. Yasu and M. Kawachi, *Electron. Lett.*, Vol. 22, pp. 321–322, 1986, hereby incorporated by reference. Such silica planar waveguides can be formed in various configurations with a relatively high degree of accuracy using the processes discussed above. For example, the silica planar waveguide 70 illustrated in FIG. 5 can be formed with 100–1000 waveguide channels 74–84 or more. For illustration and purposes of the discussion, only six waveguide channels 74–84 are shown in FIG. 5. Each waveguide channel is incrementally longer (i.e., has a longer path length) than the previous channel. For example, the waveguide channel 76 is longer than the waveguide channel 74; the waveguide channel 78 is incrementally longer than the waveguide channel 76, etc. The differences in lengths of the waveguide channels 74–84 result in incremental delays at the detector array 86, thus emulating a diffraction grating. However, unlike a diffraction grating, the use of a silica planar waveguide 70 has virtually no limitations with respect to the highest order at which the device can be effectively operated. The silica planar waveguide 70 allows extremely high order devices to be used to improve resolution (i.e., number of channels multiplied by the order) without increasing the number of channels.

An alternative method for splitting the signal into a plurality of components is an optical splitter device, such as Talbot splitter as illustrated in FIG. 6. The Talbot splitter is based on multimode self imaging. A single mode waveguide empties into a multimode cavity and is imaged into N=images of the injected single mode at a distance equal to the Talbot length of the multimode cavity divided by N. A 1×32 Talbot splitter followed by 32 cascading one by 32 splitters would provide 1,024 elements. The optical waveguides follow the Talbot splitters and provide the necessary incremental time delays. Optical gain is added by optically pumping regions of the waveguide incorporated under the same wafer as the channelizer including the mode-locked laser, signal laser, modulator, imaging lens and detector array. In particular, Talbot splitters are formed of beam splitters as generally disclosed in "Novel 1-to-N Way Integrated Optical Beam Splitters Using Symmetric Mode Mixing in GaAs/AlGaAs Multimode Waveguides", by J. M. Heatan, R. M. Jenkins, D. R. Wright, J. T. Parker, J. C. H. Birbeck and K. P. Hilton, *Appl. Phys. Lett.*, Vol. 61, No. 15, pp. 1754–1756, 1992 and "Waveguide Beam Splitters and Recombiners Based on Multiple Propagation Phenomenon", by R. M. Jenkins, R. W. J. Devereux and J. M. Heaton, *Optics Lett.*, Vol. 17, No. 14, pp. 991–993, 1992, hereby incorporated by reference. As described therein, the beam splitters generally have a plurality of equal length channels for example, the four exemplary channels, 88, 90, 92 and 94, shown in FIG. 6 forming a 1 to N (N=number of channels) beam splitter. Each channel 88, 90, 92 and 94 is optically coupled to a plurality of optical waveguides 96, 98, 100 and 102; wherein each waveguide is formed to be incrementally longer than a contiguous waveguide. In other words, referring to FIG. 6, the waveguide 100 is formed to be incrementally longer than the contiguous waveguide 102, while the waveguide 98 is formed to be incrementally longer than the contiguous waveguide 102, etc. The waveguides 96–102 form delay paths.

Various parameters influence the characteristics of a Talbot splitter used as an optical channelizer. These parameters include: the number of delay paths (i.e., waveguides 96–102); the incremental time delay between the delays (i.e., incremental differences in path length of the various channels 88–94); and the separation between the ends of the paths. For a 20 GHz channelizer with 1 GHz channel size or resolution, 40 delay paths (i.e. channels) are required with 0.5 cm increments in the path length and a 0.002 cm separation between the ends of the paths.

Referring to FIG. 6, an RF modulated input optical signal is fed into the Talbot splitter 85 and split into equal portions. For a 40-channel device 85, the RF modulated signal would be split into 40 portions. Each portion of the signal is fed into the optical waveguides 96–102 of the Talbot splitter 85. As mentioned above, the waveguides 96–102 are incrementally longer than contiguous waveguides with the ends of the channels separated by 0.002 cm. With such exit separation, each of the output signals are dispersed with an angular separation of 1.875 milliradians. If a short focal length lens, for example, f=1.067 cm, is disposed adjacent the exit, the output signal can be focused on a photodetector array 96 with an element spacing of, for example, 0.002 cm.

In practical systems, the time delays need to be controlled to a fraction of the optical wavelength. The path length may be controlled by placing heater pads on the delay lines and controlling the temperature. In particular, the optical path length is known to be the product of index of refraction n and the length L over which the heater pad has influence.

The silica planar waveguide 70 (FIG. 5) or the Talbot splitter 85 (FIG. 6) may be substituted for the diffraction grating 22 to form an optical channelizer as generally shown in FIGS. 2 and 3.

Obviously, many modifications and variations of the present invention are possible in light of the above teachings. For example, for designs where the path length becomes unwieldly for silica planar waveguide technology, fiber optics can be used to provide a compact configuration. Thus, it is to be understood that, within the scope of the appended claims, the invention may be practiced otherwise than as specifically described above.

What is claimed and desired to be secured by letters patent of the United States is:

1. An optical signal channelizer for channelizing RF signals modulated onto an optical carrier defining a modulated RF optical signal at a plurality of frequencies, the optical signal channelizer comprising:

an optical local oscillator (LO) adapted to generate a plurality of LO optical signals at a plurality of frequencies;

an optically dispersive element disposed to receive said modulated RF signals and said plurality of LO optical signals at different wavelengths for spatially separating each of said modulated RF signals and said plurality of LO optical signals into a plurality of separate optical signals at different frequencies; and a detector array spaced away from said dispersive element and configured to receive said spatially separated RF and said plurality of LO optical signals and generating electrical signals as a function of the intensity of said optical signals.

2. The signal channelizer as recited in claim 1, wherein said dispersive element is a diffraction grating.

3. The signal channelizer as recited in claim 2, wherein said diffraction grating is an echelle.

4. The optical signal channelizer as recited in claim 1, wherein said optical local oscillator (LO) includes a mode locked laser which provides a set of phase coherent optical sources separated in frequency by predetermined intervals forming a local oscillator.

5. The channelizer as recited in claim 4, further including means for directing said modulated optical signal and said mode locked laser at said dispersive element at different angles.

6. An optical signal channelizer for channelizing RF signals modulated onto an optical carrier, the optical signal channelizer comprising;

a silica planar waveguide formed with a single input port and a plurality of output ports forming a plurality of channels, at least a portion of said channels formed with predetermined different lengths for providing a plurality of channels for spatially separating said modulated RF signals; and a detector array spaced away from said optical outputs for receiving said spatially separated optical signals and providing an electrical signal proportional to the intensity to said optical signals.

7. The channelizer as recited in claim 6, wherein all of said channels are formed with different lengths.

8. The channelizer as recited in claim 7, wherein each of said channels is formed with incrementally differing lengths.

9. An optical signal channelizer for channelizing RF signals modulated onto an optical carrier, the optical signal channelizer comprising:

a Talbot splitter formed with a plurality of channels, said channels optically coupled to waveguides of different lengths for spatially separating said optical signals, said Talbot splitters formed with an optical input and a plurality of optical outputs; and a detector array spaced away from said optical splitting device for receiving said separated optical signals and generating corresponding electrical signals as a function of the intensity of the received optical signals.

10. The optical signal channelizer as recited in 9 wherein said waveguides are formed with incrementally longer lengths.

* * * * *